(12) United States Patent
Ahrens

(10) Patent No.: US 9,258,334 B2
(45) Date of Patent: Feb. 9, 2016

(54) UNIVERSE MEDIA SHUFFLING

(75) Inventor: David Ahrens, San Jose, CA (US)

(73) Assignee: Avaya Inc., Basking Ridge, NJ (US)

( * ) Notice: Subject to any disclaimer, the term of this patent is extended or adjusted under 35 U.S.C. 154(b) by 55 days.

(21) Appl. No.: 13/420,442

(22) Filed: Mar. 14, 2012

(65) Prior Publication Data

US 2013/0246640 A1   Sep. 19, 2013

(51) Int. Cl.
*H04L 29/06* (2006.01)
(52) U.S. Cl.
CPC ......... *H04L 65/1069* (2013.01); *H04L 63/0869* (2013.01)
(58) Field of Classification Search
CPC ......... H04L 45/28; H04L 45/16; H04L 45/22; H04L 45/206; H04L 63/0869; H04L 65/1069; H04W 76/041
USPC ............................. 709/225, 227; 719/155, 156
See application file for complete search history.

(56) References Cited

U.S. PATENT DOCUMENTS

| | | | |
|---|---|---|---|
| 6,968,050 B1 | 11/2005 | Pershan et al. | |
| 7,006,508 B2 * | 2/2006 | Bondy | H04M 3/2281 370/410 |
| 7,286,841 B2 * | 10/2007 | Sun | H04B 7/2681 370/278 |
| 7,454,470 B1 * | 11/2008 | Isaacs | G06Q 10/107 709/206 |
| 8,230,091 B2 * | 7/2012 | Kliland | H04L 63/029 709/227 |
| 8,504,697 B2 * | 8/2013 | Larson | H04L 29/12066 709/227 |
| 8,533,329 B2 * | 9/2013 | Hammell | G06F 21/41 709/225 |
| 2007/0019545 A1 * | 1/2007 | Alt | H04L 12/4633 370/230 |
| 2007/0211694 A1 * | 9/2007 | Rasanen | H04L 45/00 370/352 |
| 2008/0275813 A1 * | 11/2008 | Altberg | G06Q 20/10 705/39 |
| 2009/0006633 A1 * | 1/2009 | Moore | H04L 65/1006 709/228 |
| 2009/0225960 A1 * | 9/2009 | Kim | H04M 3/42017 379/88.13 |
| 2010/0185771 A1 * | 7/2010 | Gurun | G06F 15/173 709/227 |
| 2011/0149956 A1 * | 6/2011 | Alt | H04L 63/0281 370/352 |
| 2011/0191456 A1 * | 8/2011 | Jain | H04L 69/24 709/223 |
| 2011/0235631 A1 | 9/2011 | Krishnaswamy et al. | |
| 2011/0258597 A1 * | 10/2011 | Chen | H04L 65/1006 717/107 |
| 2011/0276703 A1 * | 11/2011 | Weizman | H04L 45/42 709/228 |
| 2011/0289319 A1 * | 11/2011 | Elwell | H04L 63/123 713/176 |
| 2012/0166656 A1 * | 6/2012 | Asveren | H04L 63/029 709/228 |
| 2012/0191971 A1 * | 7/2012 | Battistello | H04L 9/083 713/155 |
| 2012/0263144 A1 * | 10/2012 | Nix | H04L 29/125 370/331 |
| 2013/0145152 A1 * | 6/2013 | Maino | H04L 63/0428 713/156 |
| 2013/0170471 A1 * | 7/2013 | Nix | H04W 36/00 370/331 |

OTHER PUBLICATIONS

Peterson et al., "Enhancements for Authenticated Identity Management in the Session Initiation Protocol (SIP)", available at http://tools.ietf.org/rfc/rfc4474.txt, Aug. 2006, 39 pages.

(Continued)

*Primary Examiner* — Uzma Alam
(74) *Attorney, Agent, or Firm* — Sheridan Ross P.C.

(57) ABSTRACT

A communication broker and methods of administering the same are provided. The communication broker is adapted to direct various enterprises to set up a media channel directly therebetween while remaining in the control signaling path for the communication session. The broker may enable the enterprises to use standard authentication techniques and the Datagram Transport Layer Security (DTLS) protocol to establish the media channel.

20 Claims, 3 Drawing Sheets

(56) References Cited

OTHER PUBLICATIONS

Krishnaswamy et al., U.S. Appl. No. 13/250,008, Entitled "System and Method for Facilitating Communications Based on Trusted Relationships", filed Sep. 30, 2011, 36 pages.

Rosenberg et al. "The Public Switched Telephone Network (PSTN) Validation Protocol (PVP)," IETF, Nov. 9, 2009, 28 pages.

Rosenberg et al. "Verification Involving PSTN Reachability: Requirements and Architecture Overview," IETF, Nov. 9, 2009, 41 pages.

* cited by examiner

UNIVERSE MEDIA SHUFFLING

FIELD OF THE DISCLOSURE

The present disclosure is generally directed toward communications and more specifically toward unified communications.

BACKGROUND

In Unified Communication Federation deployment where there's a centralized broker to route signaling, a solution is needed to route the media directly between the two communicating entities (e.g., between a first enterprise and a second enterprise). If the media is routed through the centralized broker, the centralized broker has to provide large bandwidth to handle all of the media traffic. This is often cost-prohibitive to the centralized broker.

Some solutions have been described to shuffle signaling and media from the centralized broker to a Peer-to-Peer (P2P) network. U.S. application Ser. No. 13/250,008 to Krishnaswamy et al., the entire contents of which are hereby incorporated herein by reference, describes details of such a solution where a centralized broker is used by enterprises or different communicating entities to establish a trust relationship and then, after the trust relationship has been established, the entities move their communication session to a P2P network. Unfortunately, moving the communication session to a P2P network takes the centralized broker out of the signaling path, thereby preventing the centralized broker from offering additional services to the communicating entities during the communication session.

SUMMARY

It is with respect to the above issues and other problems that the embodiments presented herein were contemplated. In particular, embodiments of the present disclosure propose the ability to, among other things, establish the signaling channel from a first communicating entity (e.g., Enterprise A) to the centralized broker and also from the centralized broker to a second communicating entity (e.g., Enterprise B). After the signaling channel has been established between Enterprise A and B through the centralized broker, the broker is able to shuffle the media path so that media flows directly between Enterprise A and B. Any single type of media or combinations of media may be carried along the media path established between the enterprises including, without limitation, voice media, video media, web-content, data, images, graphics, and combinations thereof. This alleviates the centralized broker from having to purchase and maintain the required communications equipment that would otherwise be needed to support the media exchange between the communicating entities.

Some embodiments of the present disclosure utilize a centralized broker to direct different communicating entities (e.g., Enterprise A and Enterprise B or users from different enterprises) to set up the media channel according to the following: (1) broker sends Enterprise A the credentials or fingerprint of Enterprise B's credentials along with the information on how to connect to Enterprise B—this message or messages can be protected using RFC4474, the entire contents of which are hereby incorporated herein by reference; (2) broker sends Enterprise B the credentials or a fingerprint of Enterprise A's credentials along with the information on how to connect to Enterprise A—this message or messages can be protected using RFC 4474; and (3) Enterprise A and B establish a communication channel using the Datagram Transport Layer Security (DTLS) protocol to authenticate one another and exchange media encryption keys as well as the Internet Protocol (IP) address and port to use for the exchange of media.

Once the communicating entities have exchanged the necessary information, determined the IP address and port to use for the other entity, and established the media path there between, the communicating entities are capable of exchanging media directly with one another (e.g., without involving the broker in the media path). However, the control signaling exchanged between the communicating entities to control the media exchange may still pass through the centralized broker. This allows the centralized broker to remain aware of the communication session as well as possibly offer other services to the communicating entities during or after the communication session.

In accordance with at least some embodiments of the present disclosure, a method is provided which generally comprises:

receiving, at a communication broker, a request from a first communicating entity to establish a communication session with a second communicating entity;

providing information to the first communicating entity that will enable the first communicating entity to authenticate the second communicating entity as well as providing an address associated with the second communicating entity;

providing information to the second communicating entity that will enable the second communicating entity to authenticate the first communicating entity as well as providing an address associated with the first communicating entity; and maintaining a control signaling path between the first and second communicating entities at the communication broker during at least a portion of a communication session between the first and second communicating entities even though a media path for the communication session is established directly between the first and second communicating entities.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
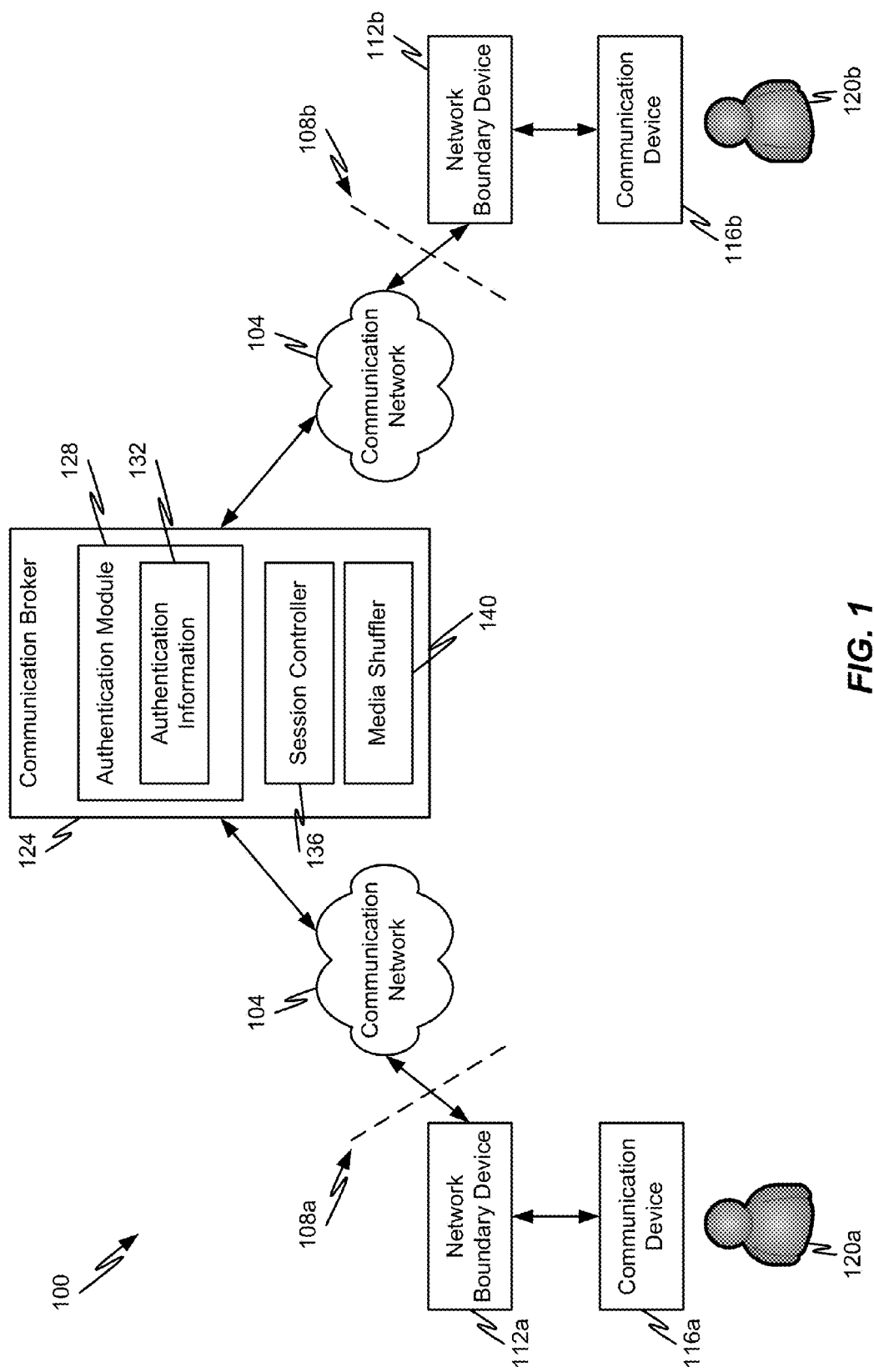
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises one or more communication networks 104 connecting one or more different communicating entities (e.g., enterprises, organizations, groups, homes, businesses, schools, corporations, individuals, families, subsets thereof, etc.) to a communication broker 124. In some embodiments, the communication broker 124 acts as a centralized broker that has established trusted relationships with each of the different communicating entities. These trusted relationships may have been established personally, via snail mail, or via communications over the communication networks 104. The trusted relationship is established vis-à-vis the sharing of authentication information from the communicating entity to the communication broker 124 and/or the sharing of contact information from the communicating entity to the communication broker 124.

One advantage of using the centralized communication broker 124 is that the communicating entities only have to establish a single trusted relationship with the communication broker 124 to enable trusted and secure communications with other communicating entities. In particular, one communicating entity is relieved from the need to re-establish a trusted relationship with each communicating entity every time a secure communication with that communicating entity is desired. Rather, each communicating entity can rely on information provided from the communication broker 124 (with whom a trusted relationship has already been established) for establishing a secure communication session with any other communicating entity.

As can be seen in FIG. 1, a communicating entity may be separated from the broader communication network 104 via an entity boundary 108a, 108b. Specifically, a first communicating entity may separate itself from the communication network 104 via a first entity boundary 108a. The first communicating entity may have one or more first entity network boundary devices 112a that help establish the boundary 108a. Behind the network boundary device(s) 112a may reside one or multiple first entity communication devices 116a that are capable of being operated by one or more first entity users 120a.

A second communicating entity may have similar components to the first communicating entity. For example, the second communicating entity may have one or more second entity network boundary devices 112b that help establish a second entity boundary 108b. Behind the network boundary device(s) 112b may reside one or multiple second entity communication devices 116b that are capable of being operated by one or more second entity users 120b.

In accordance with at least some embodiments of the present disclosure, the communication network 104 may comprise any type of known communication medium or collection of communication media and may use any type of protocols to transport messages between endpoints. In particular, the communication network 104 may support synchronous, asynchronous, real-time, near-real-time, and any other type of electronic communications between two or more communication devices (e.g., 116a, 116b) and/or between communication devices and servers.

The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a Local Area Network (LAN), a Wide Area Network (WAN), a Session Initiation Protocol (SIP) network, a cellular network, and any other type of packet-switched and/or circuit-switched network known in the art. In addition, it can be appreciated that the communication network 104 need not be limited to any one network type, and instead may be comprised of a number of different networks and/or network types.

The communication devices 116a, 116b may correspond to any collection of components that enable users 120a, 120b to exchange media (e.g., voice, video, etc.), data (e.g., emails, Short Message Service (SMS) messages, Multimedia Message Service (MMS) messages, files, presentations, documents, etc. with one another's communication devices over the communication network 104. Non-limiting examples of suitable communication devices 116a, 116b include a personal computer, laptop, tablet, Personal Digital Assistant (PDA), cellular phone, smart phone, telephone, soft phone, thin client, virtual machine, or combinations thereof. In general each communication device 116a, 116b may be adapted to support video, audio, text, and/or data communications with other communication devices 116a, 116b. The type of medium used to establish a communication channel between communication devices 116a, 116b may depend upon the communication applications available on the communication device(s) 116a, 116b.

The network boundary devices 112a, 112b may correspond to one or multiple devices that are used to maintain security within the communicating entity, especially as the communication network 104 may correspond to an untrusted network that is not necessarily considered secure. The network boundary devices 112a, 112b may also comprise the capability of interconnecting the network of the communicating entity to the communication network(s) 104 as the network of the communicating entity may not use exactly the same protocols as the communication network(s) 104. More specifically, the network boundary devices 112a, 112b may correspond to any type of network security and/or translating device known in the art. Examples of a network boundary device 112a, 112b include, without limitation, a Session Border Controller (SBC), a gateway, a Network Address Translation (NAT) device, a firewall, a router, or any other collection of hardware and/or software that performs one or more functions such as filtering, protocol translation/mapping, impedance matching, rate conversion, fault isolation, signal translation, etc. as necessary to provide interoperability and/or security between a communicating entity and the communication broker 124.

The communication broker 124 may comprise one or more components that enable the communication broker 124 to establish and maintain trusted relationships with multiple different communicating entities as well as facilitate the creation of secure communication sessions between different communicating entities. Examples of the components that may be included in the communication broker 124 include, without limitation, an authentication module 128, a session controller 136, and a media shuffler 140. Although these components are depicted as being separate components, it should be appreciated that the functionality described in connection with these components may be incorporated into a single module or, on the other hand, distributed into many more different modules or sub-modules that are running on the same or different hardware device (e.g., server, processor, processor core, etc.).

The authentication module 128 may comprise authentication information 132 that has been obtained by various different communicating entities over the course of time. Specifically, the authentication information 132 may include any type of information that can be used by one entity to authenticate (one-way or mutually) another entity. For example, the authentication information 132 may include one or more of a password, keyword, pass phrase, key or set of keys (e.g., public/private or private/private), hash value, data string, bit string, data mask, etc. Authentication information 132 may also include any information that can be used to initially establish a communication channel between entities for the purposes of authentication. In some embodiments, the authentication information 132 may include information that enables the communicating entities to establish a communication channel according to the DTLS protocol. Examples of this type of data that may be included in the authentication information include, without limitation, addressing information such as one or more IP addresses, subnet identifier, domain name, port number, etc.

The authentication module 128 may be configured to receive authentication information 132 from communicating entities after a trusted relationship has been established between the communicating entity and the communication broker 124 as well as share the authentication information 132 with other communicating entities when a communication session has been requested by one communicating entity for another communicating entity (or multiple communicating entities).

The session controller 136 may comprise one or more modules that enable the communication broker 124 to establish a communication session between different communicating entities. In particular, the session controller 136 may comprise one or more of a SIP proxy, Back-to-Back User Agent (B2BUA), or the like that is capable of establishing a communication session between the communicating entities as well as maintaining a control dialog signaling for part or all of the duration of the communication session.

The media shuffler 140, on the other hand, may comprise the capability to move a media stream from the communication broker 124 out of the communication broker 124 such that resources of the broker 124 (e.g., ports, sockets, memory, processors, etc.) are not consumed for the entire duration of the communication session between the communicating entities. However, the session controller 136 may stay in the signaling path between the communicating entities during some or all of the communication session. This enables the communication broker 124 to keep apprised of the status of the communication session, share pertinent information with the communicating entities and specifically the users 120a, 120b, all without requiring the communication broker 124 to provide the resources needed to carry the media between the communicating entities.

In some embodiments, the communication broker 124 may be owned and operated by one communicating entity, which means that the communication broker 124 does not necessarily have to be separated from all communicating entities by an entity boundary 108a, 108b. Rather, the communication broker 124 may be configured to be within one entity boundary (e.g., the first entity boundary 108a), which likely means that the first entity owns and/or operates the communication broker 124.

It should be appreciated that while FIG. 1 only depicts the communication broker 124 being connected to two communicating entities, embodiments of the present disclosure are not so limited. Rather, embodiments described herein can be applied to any system having any number of communicating entities (e.g., three, four, five, . . . , one hundred, . . . , one thousand, etc.). The usefulness of the communicating broker 124 is that it affords many different communicating entities the ability to have secure communication sessions without having to establish trusted relationships (e.g., perform a complicated key exchange) with a large number of different communicating entities.

Figure 2:
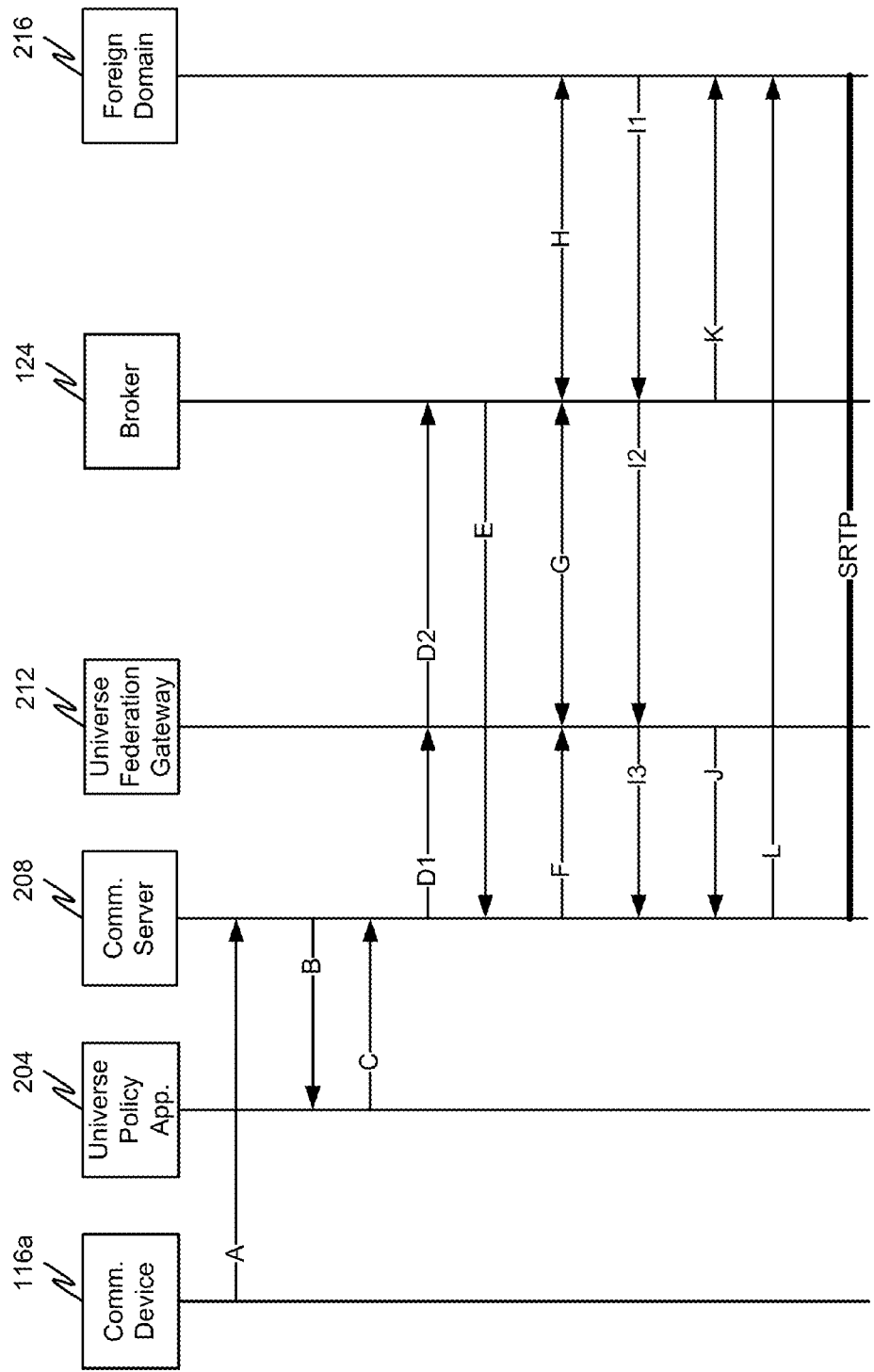
FIG. 2 is a block diagram depicting a message exchange in accordance with embodiments of the present disclosure.
Figure 3:
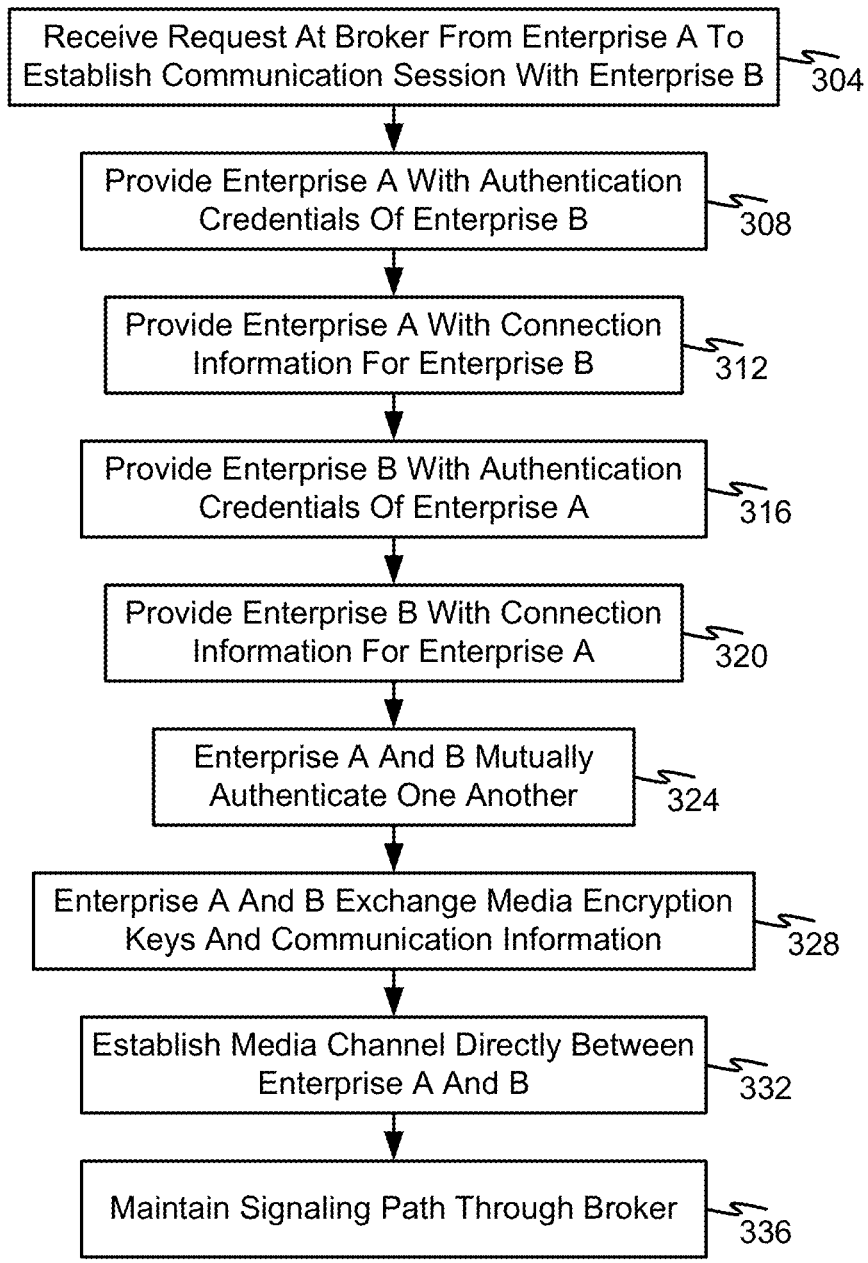
FIG. 3 is a flow diagram depicting a communication method in accordance with embodiments of the present disclosure.

With reference now to FIGS. 2 and 3, one example of a communication method that may be executed in accordance with embodiments of the present disclosure will be described. Specifically, FIG. 2 depicts the message flows that may occur in response to performing some or all of the steps depicted in FIG. 3.

Although the devices of FIG. 2 are depicted as being physically separate, it should be appreciated that one of more of the components may be included in a common server. For instance, two or more of the universe policy application 204, the communication server 208, universe federation gateway 212, and broker 124 may be included on a common server.

A communication method may be initiated when the communication broker 124 receives a request from a first communicating entity (e.g., Enterprise 1) to communicate with a second communicating entity (e.g., Enterprise 2) (step 304). The request received at the communication broker 124 may be originated by a single first entity communication device 116*a* or multiple first entity communication devices. Furthermore, as can be seen in FIG. 2, multiple messages may be transmitted before the communication broker 124 receives the request. As a non-limiting example, a SIP INVITE message (message A) may be transmitted from the first entity communication device 116*a* to a communication server 208 in the first entity communication network (e.g., behind the first entity network boundary device 112*a*). This INVITE message may include information identifying the first entity user 120*a* that is originating the request (e.g., From: Alice@A.com) as well as information identifying the second entity user 12*b* that is the target of the request (e.g., To: Bob@B.com).

The communication server 208 may comprise functionality to analyze the information contained in the INVITE message and determine that the INVITE is directed toward a foreign domain (e.g., the second communicating entity). This determination may be made by analyzing the Request URI of the INVITE message. Upon determining that the INVITE message is directed toward a foreign domain, the communication server 208 may invoke a universe policy application 204 by sending it a request (message B) to continue with transmitting the INVITE message beyond the first entity boundary 108*a*. The universe policy application 204 may respond to the communication server 208 with an Allow/Deny (message C).

Assuming that the universe policy application 204 transmits an Allow message to the communication server 208, the communication server 208 continues by sending a DNS lookup message (messages D1 and D2) to the broker 124 via the universe federation gateway 212. As can be appreciated, the universe federation gateway 212 may correspond to one example of a first entity network boundary device 112*a*. The DNS lookup message receive at the communication broker 124 may correspond to the request referenced in step 304 of FIG. 3. The response may alternatively, or in addition, correspond to some later message received at the communication broker 124 from the first communicating entity.

In response to receiving the DNS lookup message, the authentication module 128 and/or session controller 136 of the communication broker 124 may generate a response to the communication server 208 (message E) in the form of a DNSSEC/DNS resolution response.

The method continues with the communication broker 124 providing authentication information and connection information (e.g., authentication information 132) about the second communicating entity to the first communicating entity and vice versa (steps 308, 312, 316, and 320). This information may be provided to the communicating entities in one or multiple steps depending upon the protocol employed by the communication broker 124. In some embodiments, the communication broker 124 utilizes the DTLS protocol to enable the communicating entities to connect with one another and mutually authenticate with one another.

As can be seen in FIG. 2, the mutual authentication between the communicating entities may occur with an exchange of messages between the communication server 208, gateway 212, broker 124, and foreign domain 216. Specifically, the communication server 208 may forward the INVITE message (message F) to the gateway 212, where the INVITE message still identifies the intended recipient of the message (e.g., Bob@B.com). The gateway 212 and broker 124 may exchange one or more messages (message exchange G) to perform a mutual-TLS authentication as well as provide the INVITE message to the broker 124. Similarly, the foreign domain 216 and broker 124 may exchange one or more messages (message exchange H) to perform a mutual-TLS authentication as well as provide the INVITE message from the broker 124 to the foreign domain 216.

Upon completing this message exchange and after performing the mutual TLS exchange, the foreign domain 216 generates and sends a 200 OK message back to the communication server 208 (via messages I1, I2, and I3). Thereafter, the first communicating entity may authenticate the second communicating entity and vice versa (step 324). In some embodiments, the communicating entities use the authentication information that was previously provided by the broker 124 to authenticate the other communicating entity. As an example, the gateway 212 may transmit a SIP TLS message (message J) to the communication server 208. The contents of the SIP TLS message may include SDP information that identifies the address of the foreign domain 216 (or more specifically the second entity network boundary device 116*b*) as well as the credential or fingerprint to use to authenticate the second communicating entity's network boundary device 112*b*. The SIP TLS message and its contents may be protected in accordance with RFC 4474, the entire contents of which are hereby incorporated herein by reference. Moreover, the SIP TLS message may identify the first communicating entity as the client under the protocol.

At the same time, before, or after message J is transmitted to the communication server 208, the broker 124 may also transmit a similar SIP TLS message (message K) to the foreign domain 216 and specifically to the second entity network boundary device 112*b*. The contents of this SIP TLS message may include SDP information that identifies the address of the first enterprise network boundary device 112*a* as well as the credential or fingerprint to use to authenticate the first communicating entity's network boundary device 112*a*. The SIP TLS message and its contents may be protected in accordance with RFC 4474. Moreover, the SIP TLS message may identify the second communicating entity as the server under the protocol.

After the communicating entities have mutually authenticated one another, the method continues with the communication server 208 of the first communicating entity transmitting keying material or other parameters (message L) that can be used to establish an SRTP media stream between the communicating entities. This may be facilitated by the session controller 136, which is still coordinating the establishment of the communication session between the entities. After the keying material has been shared from the first communicating entity to the second communicating entity, then a SRTP media stream may be established directly between the communicating entities (step 332). In some embodiments, the media shuffler 140 enables the shuffling of the media stream away from the communication broker 124, but the signaling path between the communicating entities is still maintained through the broker 124 (step 336). The media path and corresponding signaling can be maintained until the call is terminated (e.g., due to one or both of the communication devices 116*a*, 116*b* hanging up or going back on-hook.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
receiving, at a communication broker in a device, a request from a first communicating entity to establish a communication session with a second communicating entity;
providing, by the communication broker, first information to the first communicating entity that will enable the first communicating entity to authenticate the second communicating entity as well as providing an address associated with the second communicating entity, wherein the first communicating entity has a trusted relationship with the communication broker without establishing a trusted relationship with the second communicating entity;
providing, by the communication broker, second information to the second communicating entity that will enable the second communicating entity to authenticate the first communicating entity as well as providing an address associated with the first communicating entity, wherein the second communicating entity has a trusted relationship with the communication broker without establishing a trusted relationship with the first communicating entity;
maintaining a control signaling path for the communication session between the first and second communicating entities at the communication broker during at least a portion of the communication session between the first and second communicating entities even though a media path that is established using the first and second information does not travel through the communication broker.

2. The method of claim 1, wherein the communication session is a secured communication session.

3. The method of claim 1, further comprising:
facilitating a mutual authentication between the first and second communicating entities.

4. The method of claim 3, wherein the mutual authentication is performed using the Datagram Transport Layer Security protocol.

5. The method of claim 1, wherein the address associated with the first communicating entity is an IP address of a Session Border Controller operated by the first communicating entity and wherein the address associated with the second communicating entity is an IP address of a Session Border Controller operated by the second communicating entity.

6. The method of claim 1, wherein the first and second information provided by the communication broker to the first and second entities is secured using protocols defines in RFC 4474.

7. The method of claim 1, wherein the first communicating entity corresponds to a first enterprise and the second communicating entity corresponds to a second enterprise that is different than the first enterprise.

8. The method of claim 1, wherein the first communicating entity uses the first information to authenticate the second communicating entity via a federation gateway that transmits a Session Initiation Protocol (SIP) Transport Layer Security (TLS) to a communication server, wherein the SIP TLS message contains Session Description Protocol information that includes an address of the second communicating entity's network boundary device and the information to authenticate the second communicating entity.

9. A communication broker with a non-transitory computer readable medium having stored thereon instructions that cause a computing system of the communication broker to execute a method, the instructions comprising:
instructions configured to receive a request from a first communicating entity to establish a communication session with a second communicating entity;
instructions configured to provide, by a communication broker, first information to the first communicating entity that will enable the first communicating entity to authenticate the second communicating entity as well as provide an address associated with the second communicating entity, wherein the first communicating entity has a trusted relationship with the communication broker without establishing a trusted relationship with the second communicating entity;

instructions configured to provide, by the communication broker, second information to the second communicating entity that will enable the second communicating entity to authenticate the first communicating entity as well as provide an address associated with the first communicating entity, wherein the second communicating entity has a trusted relationship with the communication broker without establishing a trusted relationship with the first communicating entity; and instructions configured to maintain a control signaling path for the communication session between the first and second communicating entities at the communication broker during at least a portion of the communication session between the first and second communicating entities even though a media path that is established using the first and second information does not travel through the communication broker.

10. The computer readable medium of claim 9, wherein the communication session is a secured communication session.

11. The computer readable medium of claim 10, wherein the media path is established using the Secured Real-time Transport Protocol.

12. The computer readable medium of claim 11, further comprising instructions configured to facilitate a mutual authentication between the first and second communicating entities.

13. The computer readable medium of claim 12, wherein the mutual authentication is performed using the Datagram Transport Layer Security protocol.

14. The computer readable medium of claim 9, wherein the address associated with the first communicating entity is an IP address of a Session Border Controller operated by the first communicating entity and wherein the address associated with the second communicating entity is an IP address of a Session Border Controller operated by the second communicating entity.

15. The computer readable medium of claim 9, wherein the first and second information provided by the communication broker to the first and second entities is secured using protocols defines in RFC 4474.

16. The computer readable medium of claim 9, wherein the first communicating entity corresponds to a first enterprise and the second communicating entity corresponds to a second enterprise that is different than the first enterprise.

17. A communication broker in a device with a processor, comprising:

a session controller executed by the processor that receives a request from a first communicating entity to establish a communication session with a second communicating entity;

an authentication module executed by the processor that provides information to the first communicating entity that will enable the first communicating entity to authenticate the second communicating entity as well as provide an address associated with the second communicating entity, wherein the authentication module is further configured to provide information to the second communicating entity that will enable the second communicating entity to authenticate the first communicating entity as well as provide an address associated with the first communicating entity, wherein the first communicating entity has a trusted relationship with the communication broker without establishing a trusted relationship with the second communicating entity, and wherein the second communicating entity has a trusted relationship with the communication broker without establishing a trusted relationship with the first communicating entity; and a media shuffler executed by the processor that moves media of the communication session between the first and second communicating entities away from the communication broker while allowing a control signaling path of the communication session to be maintained by the communication broker.

18. The communication broker of claim 17, wherein the communication session is a secured communication session.

19. The communication broker of claim 17, wherein the media path is established using the Secured Real-time Transport Protocol.

20. The communication broker of claim 17, wherein the address associated with the first communicating entity is an IP address of a Session Border Controller operated by the first communicating entity and wherein the address associated with the second communicating entity is an IP address of a Session Border Controller operated by the second communicating entity.

* * * * *